(12) United States Patent
Wohleb

(10) Patent No.: US 9,341,432 B1
(45) Date of Patent: May 17, 2016

(54) DRAWSTRING COCKING ASSEMBLY

(71) Applicant: Clem Wohleb, Burnet, TX (US)

(72) Inventor: Clem Wohleb, Burnet, TX (US)

( * ) Notice: Subject to any disclaimer, the term of this patent is extended or adjusted under 35 U.S.C. 154(b) by 0 days.

(21) Appl. No.: 14/527,359

(22) Filed: Oct. 29, 2014

(51) Int. Cl.
*F41B 5/12* (2006.01)
*F16H 25/20* (2006.01)

(52) U.S. Cl.
CPC ............... *F41B 5/123* (2013.01); *F16H 25/20* (2013.01); *F41B 5/12* (2013.01); *F16H 2025/2081* (2013.01)

(58) Field of Classification Search
CPC .................................. F41B 5/12; F41B 5/123
See application file for complete search history.

(56) References Cited

U.S. PATENT DOCUMENTS

| | | | |
|---|---|---|---|
| 5,115,795 A | 5/1992 | Farris | |
| 5,220,906 A | 6/1993 | Choma | |
| 5,445,139 A | 8/1995 | Bybee | |
| 5,823,172 A * | 10/1998 | Suggitt | F41B 5/12 124/25 |
| 6,799,566 B1 | 10/2004 | Malucelli | |
| 6,913,007 B2 | 7/2005 | Bednar | |
| D590,907 S | 4/2009 | Barnett | |
| 7,784,453 B1 | 8/2010 | Yehle | |

* cited by examiner

*Primary Examiner* — John Ricci

(57) ABSTRACT

A cocking assembly includes a housing structured to have a rod portion and a gearbox portion. The rod portion is aligned with a drawstring of a weapon. A rod is rotatably positioned within the interior of the rod portion. A motor is coupled to the gearbox portion. The motor rotates in a first direction and a second direction. An actuator actuates the motor in the first and second directions. Each of a plurality of gears is rotatably coupled to an associated one of the motor and the rod. Thus, the plurality of gears is enmeshed to transfer a rotational torque of the motor into the rod. A yoke is structured to have a block and a saddle. The block threadably engages the rod such that the yoke is urged forwardly and rearwardly along the rod. Thus, the yoke cocks the drawstring of the weapon.

6 Claims, 4 Drawing Sheets

DRAWSTRING COCKING ASSEMBLY

BACKGROUND OF THE DISCLOSURE

Field of the Disclosure

The disclosure relates to cocking devices and more particularly pertains to a new drawstring cocking device for cocking a drawstring on a weapon.

SUMMARY OF THE DISCLOSURE

An embodiment of the disclosure meets the needs presented above by generally comprising a housing structured to have a rod portion and a gearbox portion. A top of the rod portion is open to access an interior of the rod portion. The rod portion is aligned with a drawstring of a weapon. A rod is rotatably positioned within the interior of the rod portion such that the rod extends between each end of the rod portion. An outer surface of the rod is threaded. A motor is coupled to the gearbox portion. The motor rotates in a first direction and a second direction. An actuator is coupled to the gearbox portion. The actuator is electrically coupled to the motor such that the actuator actuates the motor in the first and second directions. Each of a plurality of gears is rotatably coupled to an associated one of the motor and the rod. Thus, the plurality of gears is enmeshed to transfer a rotational torque of the motor into the rod. A yoke is structured to have a block and a saddle. The block threadably engages the rod such that the yoke is urged forwardly and rearwardly along the rod when the motor rotates the rod in an associated one of the first and second directions. Thus, the yoke cocks the drawstring of the weapon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
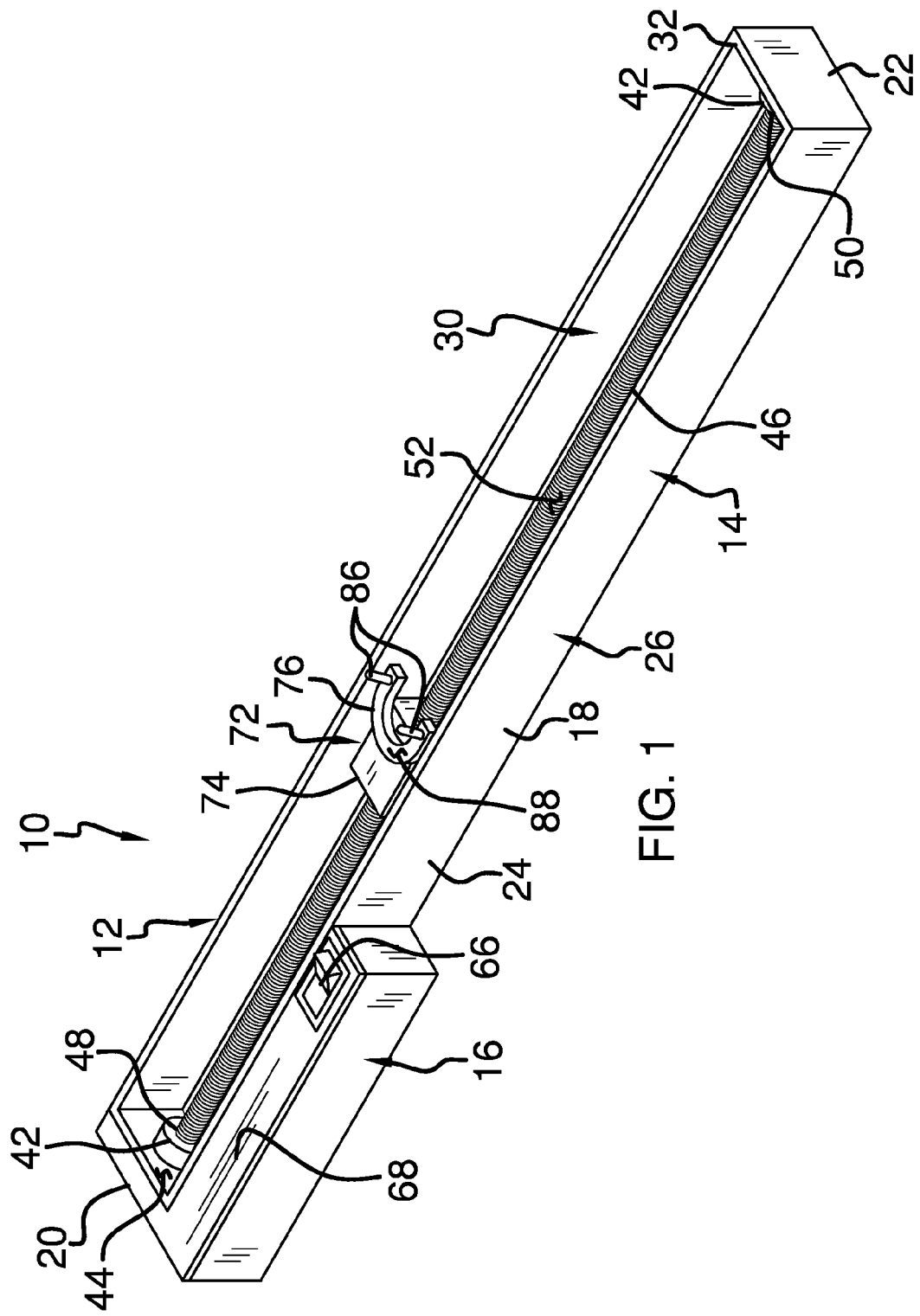
FIG. 1 is a perspective view of a cocking assembly according to an embodiment of the disclosure.
Figure 2:
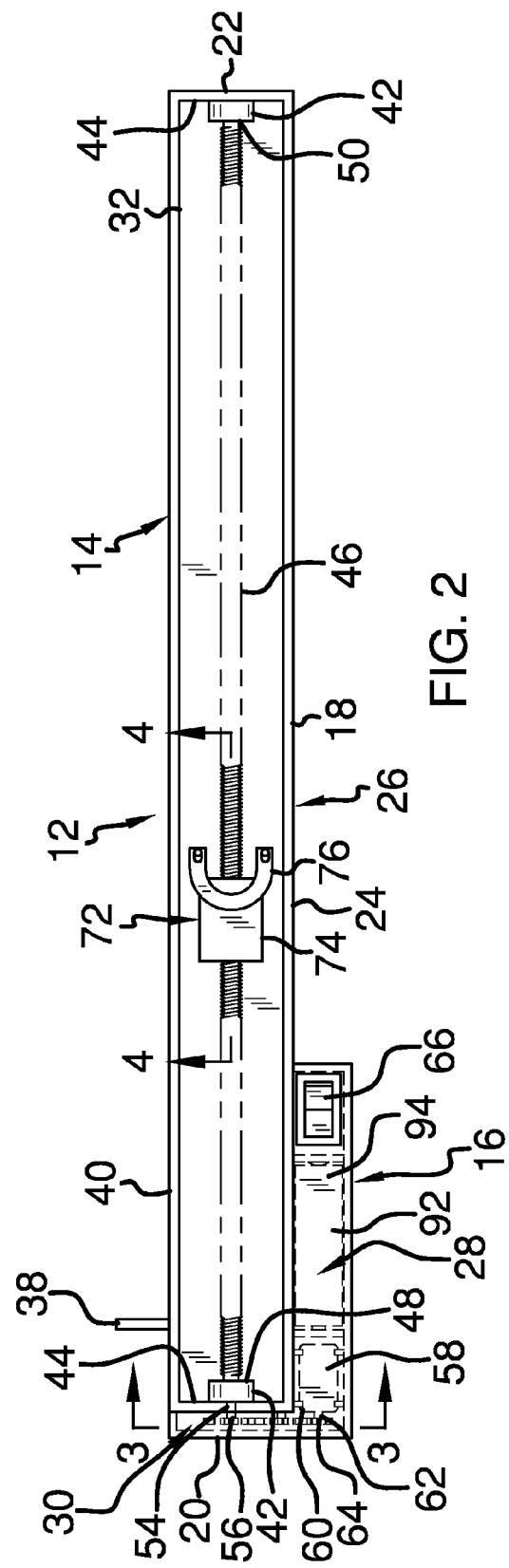
FIG. 2 is a top view of an embodiment of the disclosure.
Figure 3:
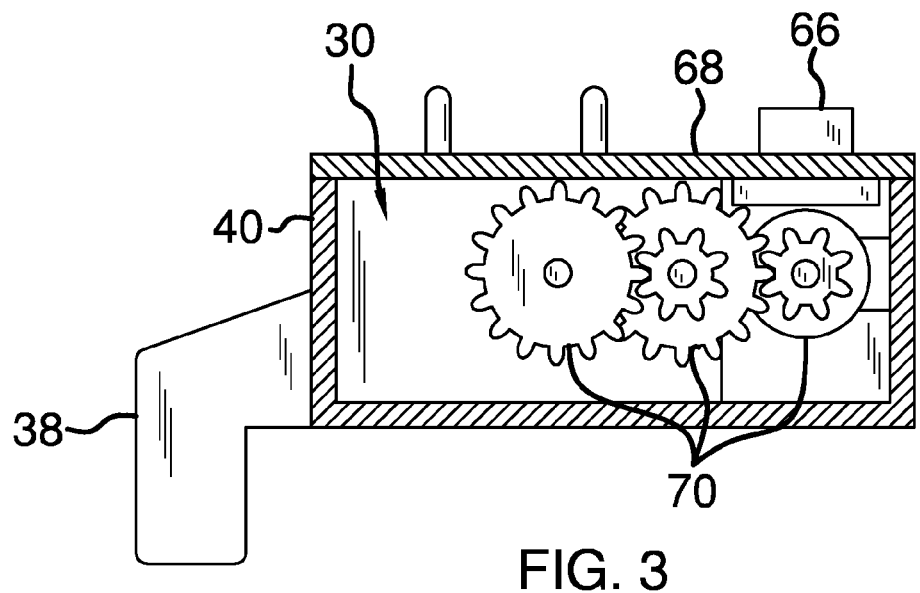
FIG. 3 is a cross sectional view taken along line 3-3 of FIG. 2 of an embodiment of the disclosure.
Figure 4:
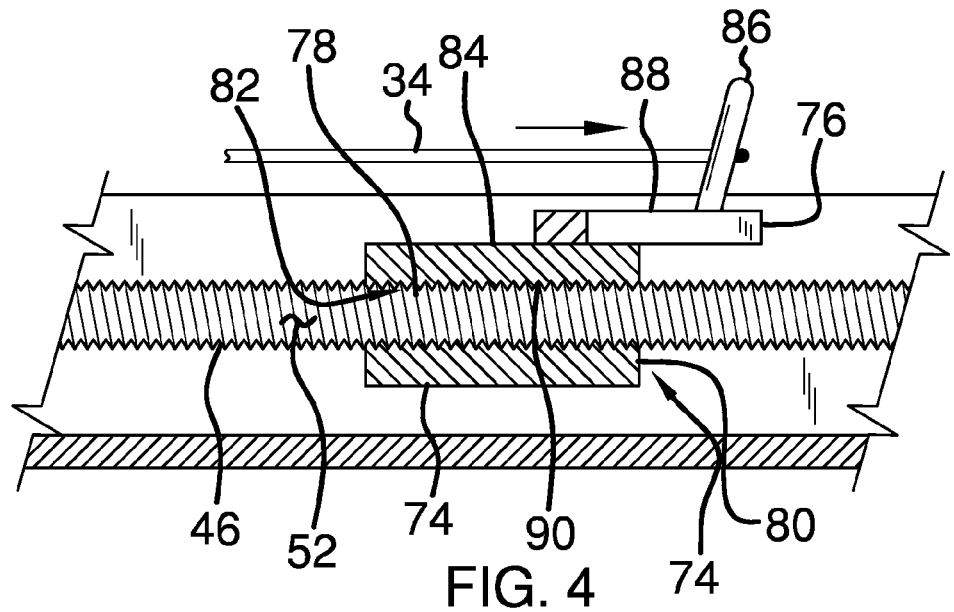
FIG. 4 is a cross sectional view taken along line 4-4 of FIG. 2 of an embodiment of the disclosure.
Figure 5:
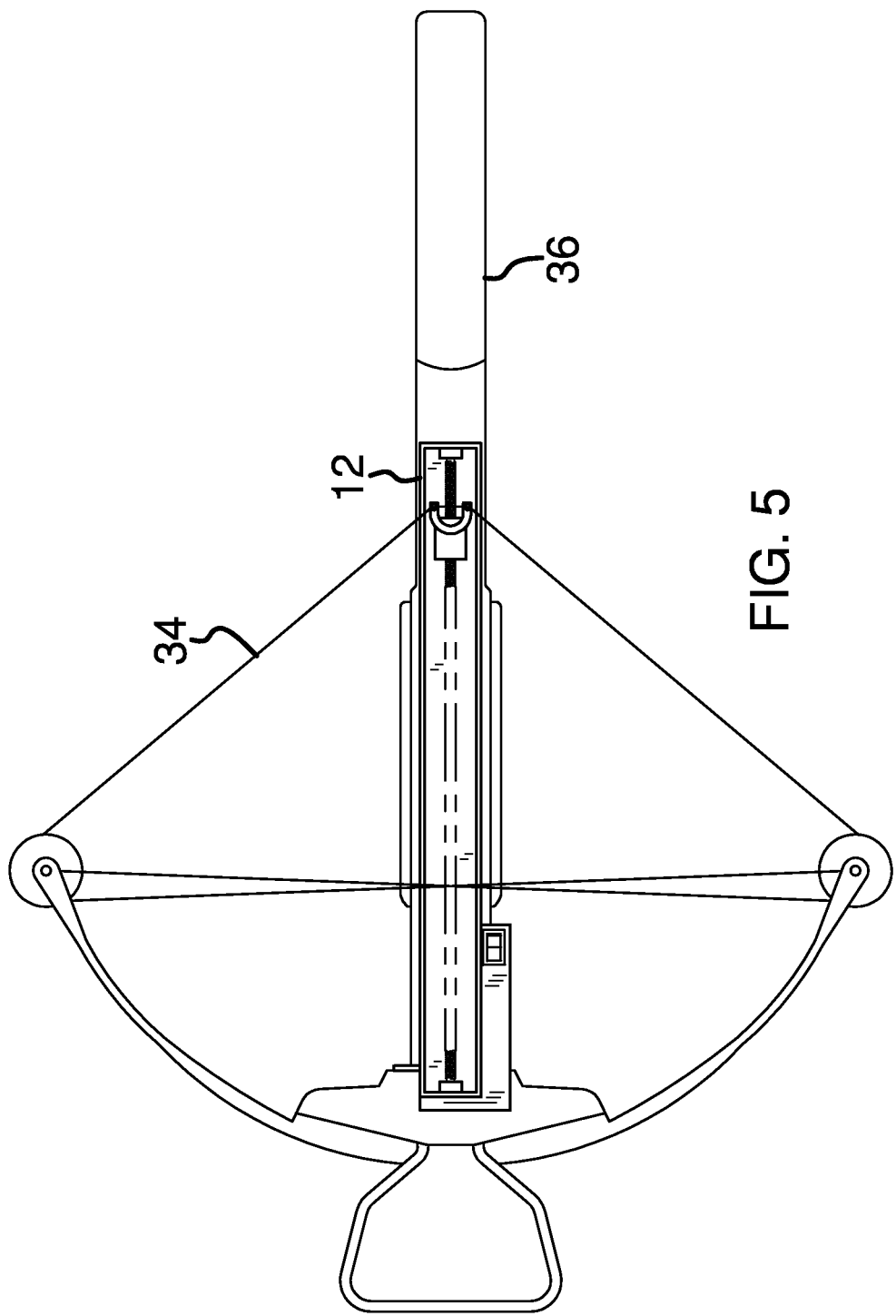
FIG. 5 is an in-use view of an embodiment of the disclosure.

With reference now to the drawings, and in particular to FIGS. 1 through 5 thereof, a new drawstring cocking device embodying the principles and concepts of an embodiment of the disclosure and generally designated by the reference numeral 10 will be described.

As best illustrated in FIGS. 1 through 5, the cocking assembly 10 generally comprises a housing 12 structured to have a rod portion 14 and a gearbox portion 16. The housing 12 has an exterior wall 18 extending between each of a front end 20 and a rear end 22 of the housing 12. Moreover, the housing 12 is elongated to define the rod portion 14. The gearbox portion 16 extends laterally away from a first lateral side 24 of the exterior wall 18 corresponding to the rod portion 14.

The gearbox portion 16 extends from the front end 20 toward a middle 26 of the rod portion 14 to define a motor space 28. Additionally, the gearbox portion 16 extends laterally along the front end 20 corresponding to the rod portion 14 to define a gear space 30. A top 32 of the rod portion 14 is open to access an interior of the rod portion 14. Finally, the rod portion 14 can be aligned with a drawstring 34 of a weapon 36. The weapon 36 may be a crossbow or the like.

A tab 38 is provided. The tab 38 is coupled to a second lateral side 40 of the exterior wall 18 corresponding to the rod portion 14. The tab 38 is bent to extend downwardly from the rod portion 14. The tab 38 engages the weapon 36 so the housing 12 is prevented from moving rearwardly along the weapon 36.

Each of a pair of bearings 42 is coupled to an inside surface 44 of an associated one of the front end 20 and the rear end 22 corresponding to the rod portion 14. A rod 46 is provided. Each of a first end 48 and a second end 50 of the rod 46 is rotatably coupled to an associated one of the bearings 42. An outer surface 52 of the rod 46 is threaded. A first shaft 54 is rotatably coupled to the first end 48. The first shaft 54 extends through the front end 20 of the housing 12 corresponding to the rod portion 14 so a free end 56 of the first shaft 54 is positioned within the gear space 30.

A motor 58 is positioned within the motor space 28 such that a frontmost end 60 of the motor 58 is aligned with the gear space 30. The motor 58 rotates in a first direction and a second direction. The motor 58 may be an electrical motor or the like. A second shaft 62 is rotatably coupled to the frontmost end 60 of the motor 58 so a free end 64 of the second shaft 62 is positioned within the gear space 30.

An actuator 66 is coupled to an uppermost side 68 of the gearbox portion 16. The actuator 66 is electrically coupled to the motor 58 such that the actuator 66 actuates the motor 58 in the first and second directions. Each of a plurality of gears 70 is positioned within the gear space 30 such that the gears 70 extend between the first shaft 54 and the second shaft 62. An associated pair of the gears 70 each is rotatably coupled to a corresponding one of the first 54 and second 62 shafts such that the gears 70 are enmeshed to transfer a rotational torque of the motor 58 into the rod 46.

A yoke 72 is provided. The yoke 72 is structured to have a block 74 and a saddle 76. The block 74 has a forwardmost end 78 and a rearmost end 80. Moreover, the block 74 has an opening 82 extending through the forwardmost end 78 and the rearmost end 80. The saddle 76 is coupled to a topmost side 84 of the block 74. The saddle 76 comprises a pair of pins 86 each extending upwardly from a top surface 88 of the saddle 76. Thus, the pins 86 engage the drawstring 34 of the weapon 36.

The rod 46 extends through the opening 82 in the block 74 such that the rod 46 threadably engages a bounding surface 90 of the opening 82. Thus, the yoke 72 is urged forwardly and rearwardly along the rod 46 when the motor 58 rotates the rod 46 in an associated one of the first and second directions. The yoke 72 cocks the drawstring 34 of the weapon 36.

A power supply 92 is positioned within the gearbox portion 16 of the housing 12. The power supply 92 is electrically coupled to the actuator 66. The power supply 92 comprises at least one battery 94. The uppermost side 68 of the gearbox portion 16 is removable to access the power supply 92.

In use, the housing 12 is positioned between the weapon 36 and the drawstring 34 so the tab 38 engages the weapon 36. The actuator 66 is actuated to rotate the rod 46 in the first direction. The yoke 72 urges the drawstring 34 rearwardly along the weapon 36 until the drawstring 34 is cocked. The housing 12 is removed from the weapon 36 after the drawstring 34 is cocked.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cocking assembly comprising:
   a housing structured to have a rod portion and a gearbox portion, a top of said rod portion being open to access an interior of said rod portion, said rod portion being configured to be aligned with a drawstring of a weapon;
   a rod rotatably positioned within said interior of said rod portion such that said rod extends between each end of said rod portion, an outer surface of said rod being threaded;
   a motor positioned within said gearbox portion, said motor rotating in a first direction and a second direction;
   an actuator coupled to said gearbox portion, said actuator being electrically coupled to said motor such that said actuator actuates said motor in said first and second directions;
   each of a plurality of gears being rotatably coupled to an associated one of said motor and said rod such that said plurality of gears is enmeshed to transfer a rotational torque of said motor into said rod;
   a yoke structured to have a block and a saddle, said block threadably engaging said rod such that said yoke is urged forwardly and rearwardly along said rod when said motor rotates said rod in an associated one of said first and second directions wherein said yoke is configured to cock the drawstring of the weapon;
   said housing having an exterior wall extending between each of a front end and a rear end of said housing, said housing being elongated to define said rod portion, said gearbox portion extending laterally away from a first lateral side of said exterior wall corresponding to said rod portion such that said gearbox portion extends from said front end toward a middle of said rod portion to define a motor space, said gearbox portion extending laterally along said front end corresponding to said rod portion to define a gear space; and
   each of a first end and a second end of said rod being rotatably coupled to an inside surface of an associated one of said front end and said rear end corresponding to said rod portion.

2. The assembly according to claim 1, wherein said motor being positioned within said motor space such that a frontmost end of said motor is aligned with said gear space, each of said gears being positioned within said gear space such that said gears extends between said frontmost end of said motor and said first end of said rod.

3. The assembly according to claim 1, wherein said block having a forwardmost end and a rearmost end, said block having an opening extending through said forwardmost end and said rearmost end, said rod extending through said opening such that said rod threadably engages a bounding surface of said opening.

4. The assembly according to claim 1, further comprising a power supply positioned within said gearbox portion, said power supply being electrically coupled to said actuator, said power supply comprising at least one battery.

5. A cocking assembly comprising:
   a housing structured to have a rod portion and a gearbox portion, a top of said rod portion being open to access an interior of said rod portion, said rod portion being configured to be aligned with a drawstring of a weapon;
   a rod rotatably positioned within said interior of said rod portion such that said rod extends between each end of said rod portion, an outer surface of said rod being threaded;
   a motor positioned within said gearbox portion, said motor rotating in a first direction and a second direction;
   an actuator coupled to said gearbox portion, said actuator being electrically coupled to said motor such that said actuator actuates said motor in said first and second directions;
   each of a plurality of gears being rotatably coupled to an associated one of said motor and said rod such that said plurality of gears is enmeshed to transfer a rotational torque of said motor into said rod; and
   a yoke structured to have a block and a saddle, said block threadably engaging said rod such that said yoke is urged forwardly and rearwardly along said rod when said motor rotates said rod in an associated one of said first and second directions wherein said yoke is configured to cock the drawstring of the weapon, said block having a forwardmost end and a rearmost end, said block having an opening extending through said forwardmost end and said rearmost end, said rod extending through said opening such that said rod threadably engages a bounding surface of said opening, said saddle being coupled to a topmost side of said block, said saddle comprising a pair of pins each extending upwardly from a top surface of said saddle such that said pins are configured to engage the drawstring of the weapon.

6. A cocking assembly comprising:
   a housing structured to have a rod portion and a gearbox portion, said housing having an exterior wall extending between each of a front end and a rear end of said housing, said housing being elongated to define said rod portion, said gearbox portion extending laterally away from a first lateral side of said exterior wall corresponding to said rod portion to define a motor space, said gearbox portion extending from said front end toward a middle of said rod portion, said gearbox portion extending laterally along said front end corresponding to said rod portion to define a gear space, a top of said rod portion being open to access an interior of said rod portion, said rod portion being configured to be aligned with a drawstring of a weapon;

a rod, each of a first end and a second end of said rod being rotatably coupled to an inside surface of an associated one of said front end and said rear end corresponding to said rod portion, an outer surface of said rod being threaded;

a motor positioned within said motor space such that a frontmost end of said motor is aligned with said gear space, said motor rotating in a first direction and a second direction;

an actuator coupled to said gearbox portion, said actuator being electrically coupled to said motor such that said actuator actuates said motor in said first and second directions;

each of a plurality of gears being positioned within said gear space such that said gears extends between said frontmost end of said motor and said first end of said rod, an associated pair of said gears each being rotatably coupled to a corresponding one of said motor and said rod such that said gears is enmeshed to transfer a rotational torque of said motor into said rod;

a yoke structured to have a block and a saddle, said block having a forwardmost end and a rearmost end, said block having an opening extending through said forwardmost end and said rearmost end, said saddle being coupled to a topmost side of said block, said saddle comprising a pair of pins each extending upwardly from a top surface of said saddle such that said pins are configured to engage the drawstring of the weapon;

said rod extending through said opening such that said rod threadably engages a bounding surface of said opening, said yoke being urged forwardly and rearwardly along said rod when said motor rotates said rod in an associated one of said first and second directions wherein said yoke is configured to cock the drawstring of the weapon; and a power supply positioned within said gearbox portion, said power supply being electrically coupled to said actuator, said power supply comprising at least one battery.

\* \* \* \* \*